(12) United States Patent
Chou

(10) Patent No.: US 6,307,463 B1
(45) Date of Patent: Oct. 23, 2001

(54) TELEPHONE REMOTE CONTROL TIMER

(76) Inventor: Hiou-Shen Chou, No. 22, Alley 15, Lane 151, Sec. 2, Chung Shan Rd., Shulin City, Taipei Hsien (TW)

( * ) Notice: Subject to any disclaimer, the term of this patent is extended or adjusted under 35 U.S.C. 154(b) by 0 days.

(21) Appl. No.: 09/745,554

(22) Filed: Dec. 26, 2000

(51) Int. Cl.[7] .................................................. G08B 1/00
(52) U.S. Cl. ............................. 340/309.15; 340/309.6; 340/652; 379/102.03; 379/102.04
(58) Field of Search ....................... 340/309.15, 309.6, 340/825.69, 825.72, 635, 652; 379/102.01, 102.02–102.07

(56) References Cited

U.S. PATENT DOCUMENTS

| | | | |
|---|---|---|---|
| 4,232,195 | * | 11/1980 | Bartelink . |
| 5,268,666 | * | 12/1993 | Michel et al. . |
| 5,379,341 | * | 1/1995 | Wan . |
| 5,448,630 | * | 9/1995 | Barstow .............................. 379/199 |
| 5,528,673 | * | 6/1996 | Rosenthal ....................... 379/102.02 |

* cited by examiner

Primary Examiner—Daniel J. Wu
(74) Attorney, Agent, or Firm—Birch, Stewart, Kolasch & Birch, LLP

(57) ABSTRACT

The present invention relates to a telephone remote control timer having a control circuit board inside a housing thereof. The control circuit board contains an AC power source circuit, a stabilized rectification circuit, a ringing circuit, a signal receiving circuit, a holding circuit, a microprocessor, a timing circuit and a reset circuit. The timing data can be transmitted to the microprocessor of the present invention through a telephone line for a convenient timing control in starting or stopping the power supply.

3 Claims, 3 Drawing Sheets

TELEPHONE REMOTE CONTROL TIMER

BACKGROUND OF THE INVENTION

1. Field of the Invention

The present invention relates to a telephone remote control timer, more particularly, to a timer remotely controlled by outdoor telephone. After connected with a telephone set, a signal receiving circuit of the present invention is used to send the control signal (dialing numbers) of the user to a microprocessor for performing all timing setting and for controlling the time to supply power source.

2. Description of the Prior Art

Generally, the conventional electric appliance does not have the timing control function when the appliance is switched on or switched off. In forgetting to turn off the appliance, the electrical energy is easily to be wasted or the electrical source is over-consumed to cause malfunction of the appliance or even explosion, fire and other damages. Besides, the actuation of the appliances can't be preset, for example, the air-conditioner and the rice cooker are unable to be actuated before the user arrives home.

In order to resolve the above-mentioned problem, a power source timing system is fitted in electrical appliances or the user buys a timer set for connection to the appliance. However, it's very impractical because these solutions have to be operated manually.

SUMMARY OF THE INVENTION

It is therefore a primary object of the present invention to eliminate the above-mentioned drawbacks and to provide a telephone remote control timer wherein the power source circuit can be actuated by outdoor telephone for a rapid and convenient timing control.

In order to reach the above-mentioned object, the telephone remote control timer of the present invention at least includes an AC power plug, an AC power socket, a telephone cable jack, and a control circuit board inside a housing thereof. After the timer is connected with power source, the electric appliance and telephone cable, the control circuit board inside can receive control signals (dialing numbers) from telephone set. The signals are decoded, processed and saved by the microprocessor in order to duly control the actuation of the power source circuit. Thus, a rapid and convenient timing setting and control are attainable.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
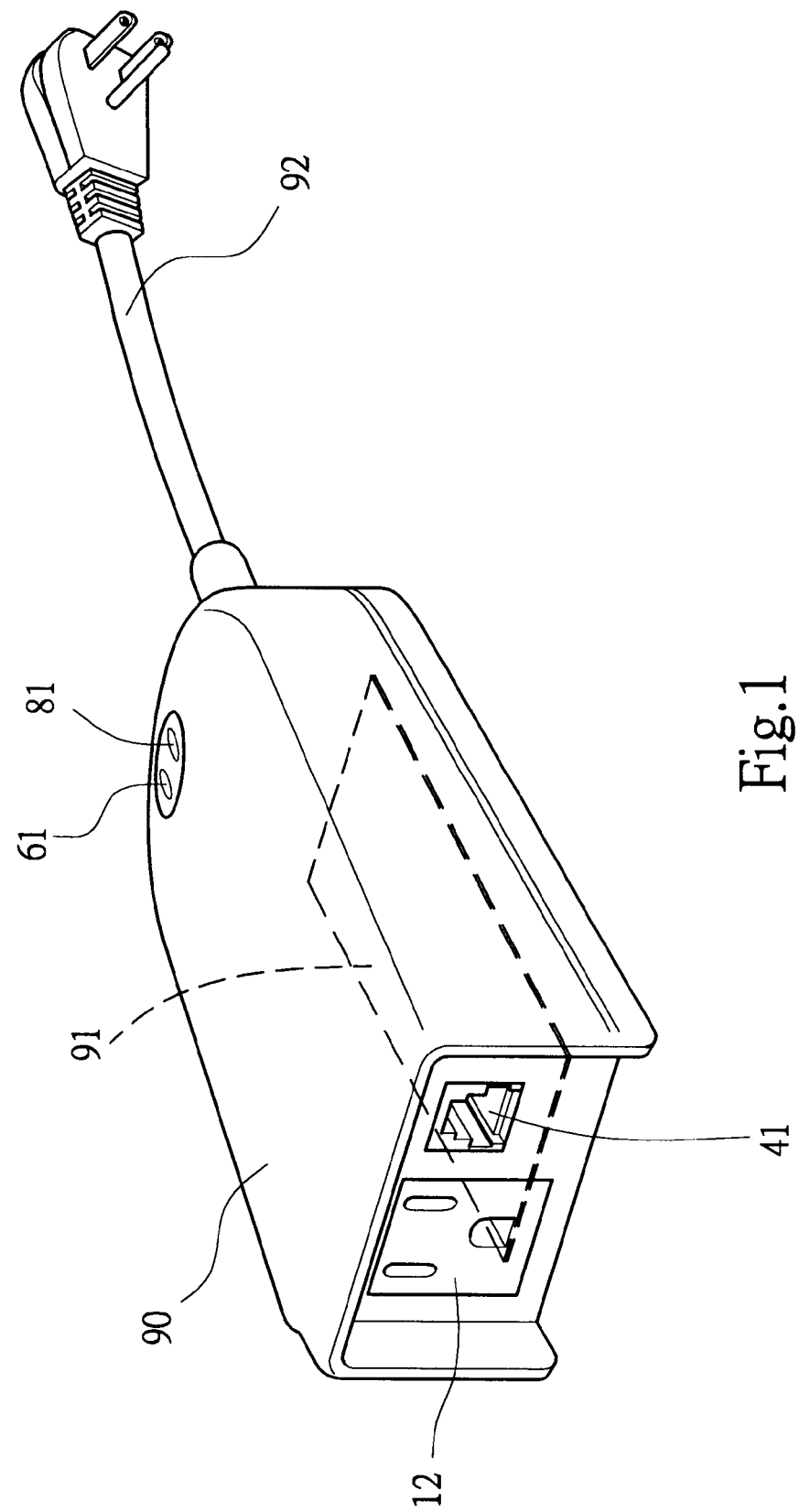
FIG. 1 is a perspective assembly view of the present invention.

First of all, referring to FIG. 1, the telephone remote control timer of the present invention at least includes an AC power plug 92, an AC power socket 12, a telephone cable jack 41 at the outer side of a housing 90 and a control circuit board 91 inside the housing 90. Moreover, a change-over button 61 and a reset key 81 are disposed at proper position thereof.

Figure 2:
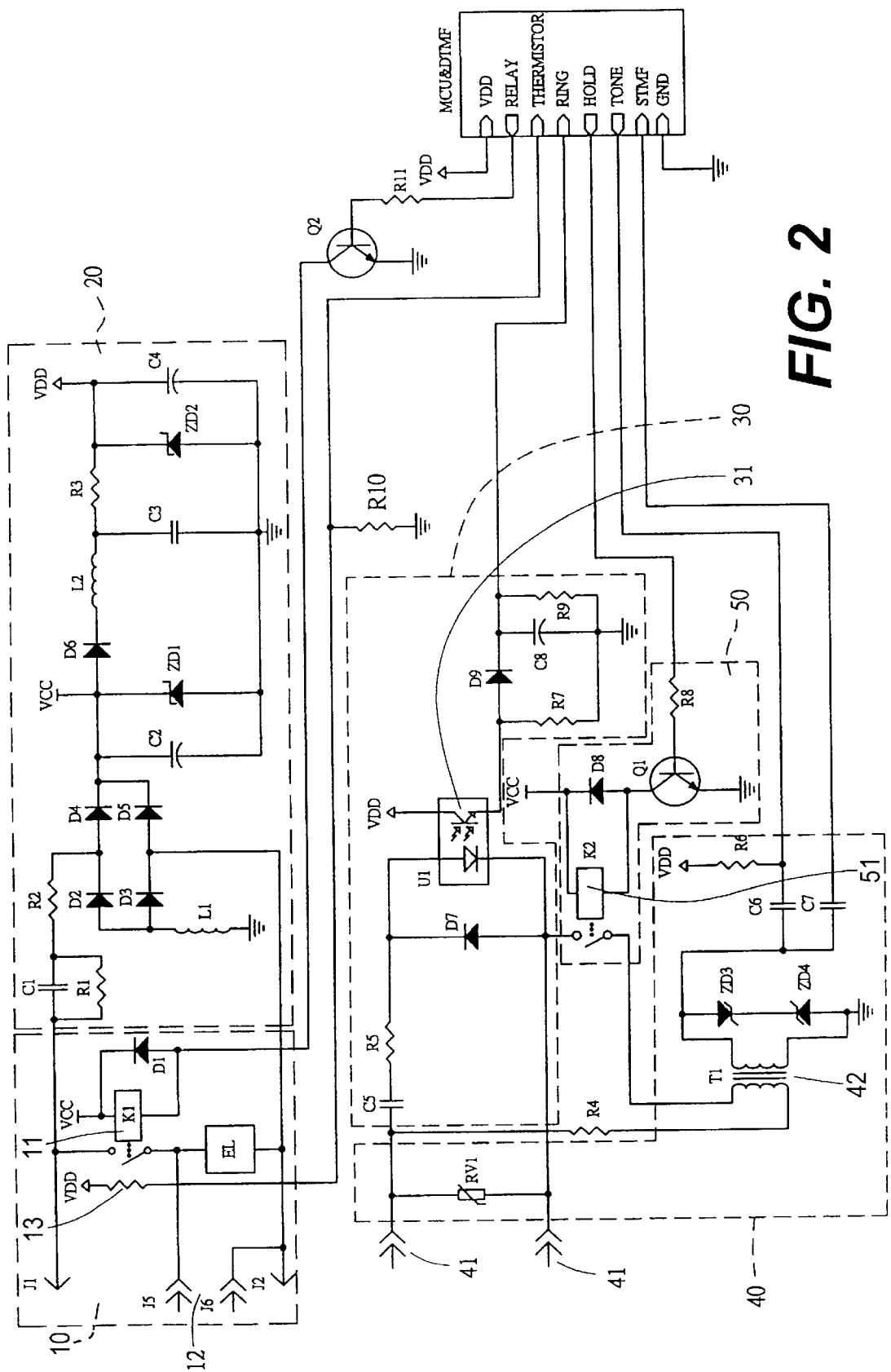
FIG. 2 is a circuit diagram of the timing design of the software of the present invention.
Figure 3:
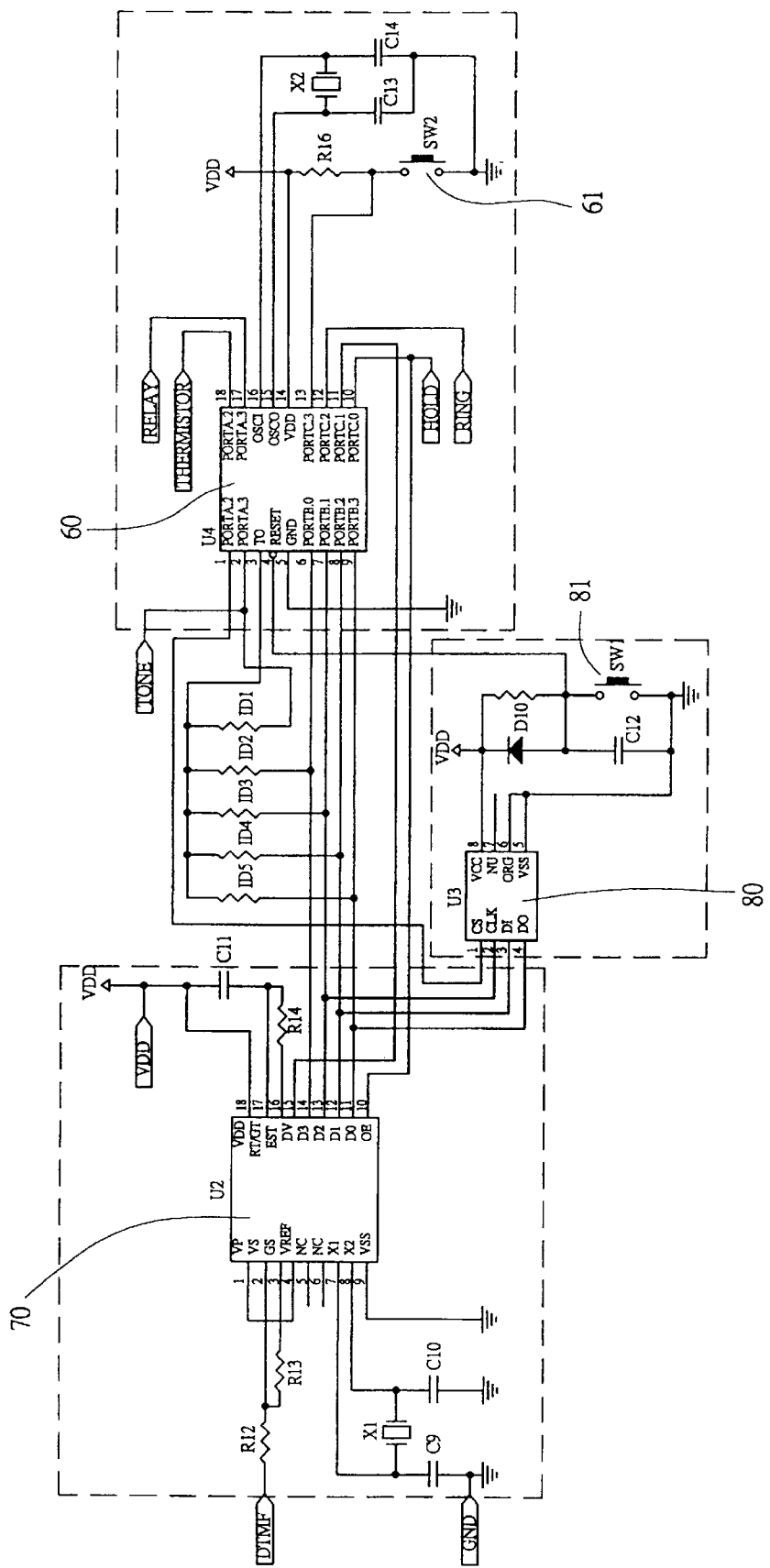
FIG. 3 is a circuit diagram of the whole structure of the present invention.

It's apparent from FIGS. 2 and 3 that the control circuit board 91 contains an AC power source circuit 10, a stabilized rectification circuit 20, a ringing circuit 30, a signal receiving circuit 40, a holding circuit 50, a microprocessor 60, a timing circuit 70 and a reset circuit 80.

The function of the above-mentioned elements are detailed as follows:

The AC power source circuit 10 with input function of AC power source is composed of a relay 11, the AC power socket 12, and a thermistor 13. After AC power source is inputted by means of the AC power source circuit 10, the stabilized rectification circuit 20 converts AC power source into DC power source for supplying required power by other circuits and other devices (microprocessor, memory, timing integrated circuit, etc.). The microprocessor 60 is used to connect and process all of the circuits. The ringing circuit 30 is used to send the ringing signals from the telephone set to the microprocessor 60. The holding circuit 50 is used to receive a control signal from the microprocessor 60 to actuate a relay 51. The signal receiving circuit 40 is used to send the dialing numbers to the microprocessor 60 while the timing circuit 70 is used to save the timing signal sent by the microprocessor 60 and to regularly feed signals back to the microprocessor 60.

In using the above-mentioned assembled elements, referring to FIG. 2, the telephone cable and the electric appliance are firstly connected to the present invention. After the power source is connected to the AC power source circuit 10 and a telephone signal is transmitted by a telephone cable, a ringing signal will be sent to the microprocessor 60 through an optical coupler 31 of the ringing circuit 30. Thereafter, the microprocessor 60 gives a command to actuate the relay 51 of the holding circuit 50 whereupon the whole circuit is connected. At this time, the signal receiving circuit 40 is ready to send control signals of the user to the microprocessor 60 of the present invention.

In accordance with the above-mentioned configuration, the AC power source circuit 10 is disconnected after the relay 11 of the AC power source circuit 10 receives a disconnection command sent by the microprocessor 60.

Besides, the thermistor 13 of the AC power source circuit 10 is used to detect the temperature of the contact point of the AC power socket 12. If the temperature of the detection point amounts to 70° C. for a certain time, this detection signal will be fed back to the microprocessor 60.

As shown in FIG. 3, the timing control signal can be inputted and saved by the microprocessor 60 to the timing circuit 70. When the preset time is reached, a timing control signal will be immediately transmitted to the microprocessor 60 which sends a control signal to the relay 11 for controlling the AC power socket 12 in a connected or disconnected state.

Additionally, the reset circuit 80 is interposed between the microprocessor 60 and the timing circuit 70. The timing data previously saved can be completely eliminated by the reset key 81 mounted on the housing 90.

Furthermore, the change-over button 61 is fitted above the microprocessor 60 and is used to change over the internal programs of the microprocessor 60 for receiving the control signal from the on-line telephone and the external telephone.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A telephone remote control timer comprising:

an AC power source circuit having input function of AC power source and being composed of a relay, the AC power socket, and a thermistor;

a stabilized rectification circuit converting AC power source into DC power source for supplying required power to other circuits and other devices after AC power source is inputted through the AC power source circuit;

a microprocessor used to connect and process all circuits;

a ringing circuit used to send the ringing signals from the telephone set to said microprocessor through an optical coupler;

a holding circuit used to receive a control signal from said microprocessor to actuate a relay thereof;

a signal receiving circuit connected with said AC power socket and an induction coil through a telephone signal cable and being used to send the dialing numbers to said microprocessor;

a timing circuit used to save the timing signal sent by said microprocessor and to regularly feed signals back to said microprocessor;

a reset circuit interposed between said microprocessor and said timing circuit while the timing data previously saved can be completely eliminated by a reset key mounted on a housing of said timer;

wherein the timing data are transmitted to said microprocessor through telephone line for a convenient timing control in starting or stopping the power supply to an electrical appliance, and wherein said microprocessor defines the setting value of said timing circuit and controls said AC power source circuit, said stabilized rectification circuit, said ringing circuit, said signal receiving circuit, said hold circuit and said reset circuit after receipt of control signals sent by said signal receiving circuit so as to reach a complete function of the telephone remote control.

2. The telephone remote control timer as claimed in claim 1, wherein a thermistor of said AC power source circuit is used to detect the temperature of the contact point of said AC power socket, and wherein this detection signal will be fed back to said microprocessor for controlling a relay of said stabilized rectification circuit to perform an automatic disconnection if the temperature of the detection point is kept at 70° C. for a certain time.

3. The telephone remote control timer as claimed in claim 1, wherein a change-over button is fitted above said microprocessor and is used to change over the internal programs of said microprocessor for receiving the control signal from the on-line telephone and the external telephone.

* * * * *